United States Patent [19]

Morrison et al.

[11] Patent Number: 4,464,895

[45] Date of Patent: Aug. 14, 1984

[54] GAS TURBINE ENGINE STARTING TECHNIQUE AND CONTROL

[75] Inventors: Terry Morrison, Vernon, Conn.; Jay D. Meador, Indianapolis, Ind.

[73] Assignee: Chandler Evans Inc., West Hartford, Conn.

[21] Appl. No.: 382,161

[22] Filed: May 26, 1982

[51] Int. Cl.³ .............................. F02C 7/26; F02C 9/28
[52] U.S. Cl. .............................. 60/39.141; 60/39.281
[58] Field of Search .................... 60/39.141, 39.281

[56] References Cited

U.S. PATENT DOCUMENTS

| | | | |
|---|---|---|---|
| 3,242,367 | 12/1966 | Bauger et al. | 60/39.141 |
| 3,520,133 | 7/1970 | Loft et al. | 60/39.141 |
| 3,688,495 | 9/1972 | Fehler et al. | 60/39.281 |
| 4,015,426 | 4/1977 | Hobo et al. | 60/39.281 |

*Primary Examiner*—Louis J. Casaregola

[57] ABSTRACT

The prompt starting of a gas turbine engine is achieved, even when utilizing comparatively poor grade fuel with relatively high viscosity, by modulating the fuel flow between high and low flow rates during the ignition portion of a start schedule. The fuel flow modulation is accomplished by delivering a pulse width modulated control signal to a fuel metering device and modulation is terminated when ignition is verified.

4 Claims, 1 Drawing Figure

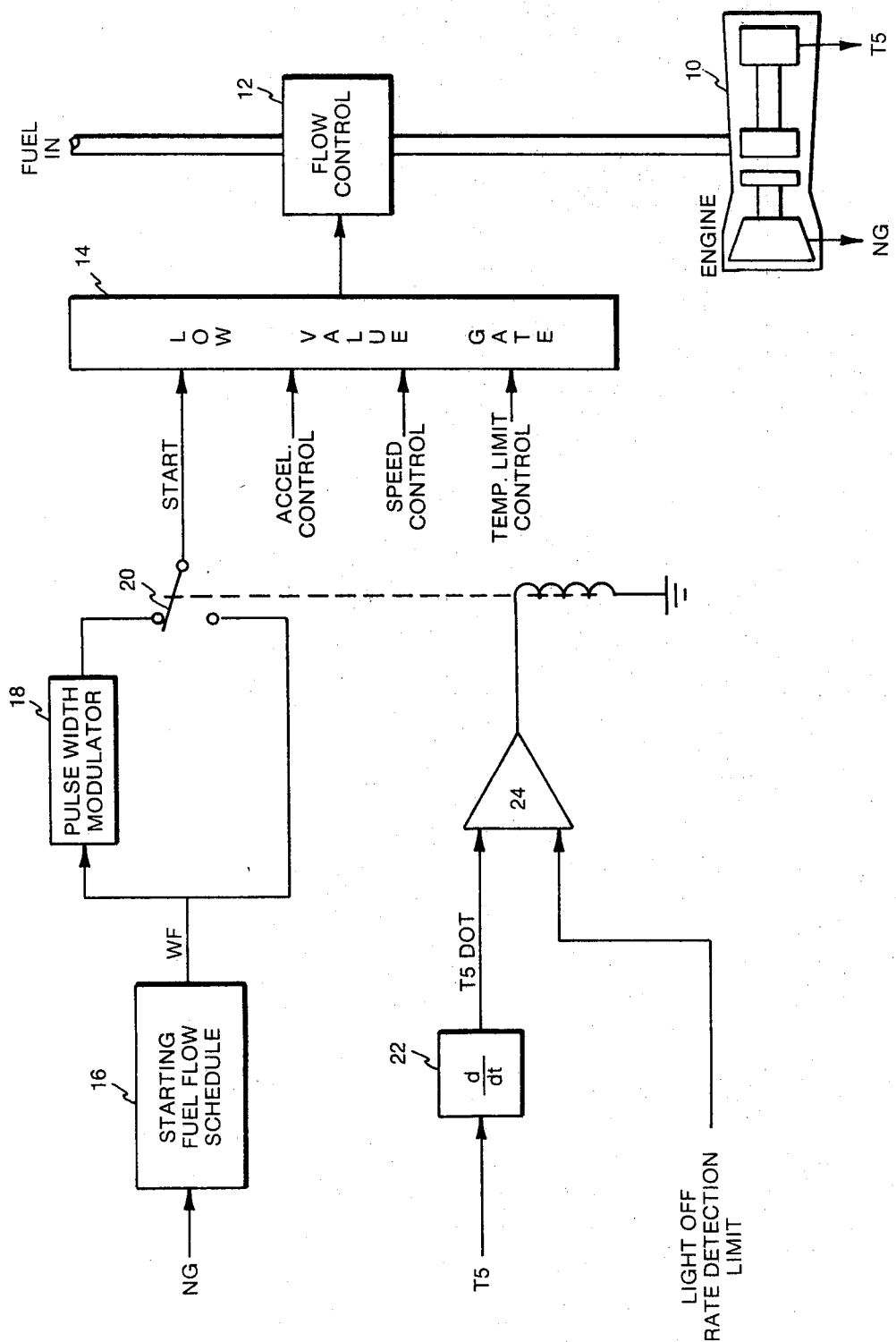

GAS TURBINE ENGINE STARTING TECHNIQUE AND CONTROL

TECHNICAL FIELD

This invention relates to the operation of gas turbine engines and particularly to facilitating the starting of such engines. More specifically, the present invention is directed to improvements in electronic fuel controls for gas turbine engines and especially to starting circuits for use in such controls. Accordingly, the general objects of the present invention are to provide novel and improved methods and apparatus of such character.

BACKGROUND ART

There has been a long-standing desire to ensure the ability of gas turbine engines to be operated with "lower" grade fuels. A "low" grade fuel is a fuel having comparatively low octane and/or a comparatively high viscosity. The viscosity of jet engine fuel will also vary with the ambient temperature and thus even the better grade fuels will become less viscous when subjected to extreme cold. The ability to employ lower grade fuels, for example fuels derived from oil shale, would provide insurance against the interruption of normal petroleum supplies. Further, and this is particularly true in the case of the military, the necessity of using lower grade fuel may be dictated by local availability and/or the need to use fuel which has been in storage for a considerable period of time.

The characteristics of a fuel, particularly a jet engine fuel, are particularly significant during starting when the fuel is delivered to the burners at a comparatively low pressure. Under such conditions, if the viscosity of the fuel is too great there will be insufficient atomization and at least a significant portion of the fuel will be injected into the burners in the form of droplets. Accordingly, a fuel/air mixture appropriate for ignition will not be created and the engine will not start. The fuel delivered to the burners will, of course, accumulate and if ignition is subsequently achieved, this excess fuel will burn resulting in engine over-temperature and possible damage.

In the past, there have principally been two approaches to achieving rapid ignition and thus successful starting of a gas turbine engine. Firstly, and most obviously, better grade fuels, i.e., fuels having a comparatively high octane and comparatively low viscosity, were selected for use. The second approach has been to operate the engine with an additional enrichment schedule wherein excess fuel is deliberately delivered to the burners in a start mode. The excess flow, for a given supply pressure, results in a greater pressure drop across the fuel nozzles and thus produces a higher degree of atomization. However, employment of an enrichment schedule carries the inherent risk that, because of the excess fuel, there will be a "hot" start which may cause engine damage.

DISCLOSURE OF THE INVENTION

The present invention overcomes the above briefly-discussed and other deficiencies of the prior art by providing a novel gas turbine engine starting technique wherein the fuel flow is pulsated in such a manner as to achieve enhanced atomization for the operating conditions without the delivery of excess fuel into the burners. The present invention also contemplates apparatus for modulating the fuel flow during the ignition phase of the start mode of a gas turbine engine and for automatically terminating the modulation upon the achievement of ignition.

Apparatus in accordance with the present invention includes, as the actual fuel metering device, a solenoid operated valve or other electromechanical device characterized by a relatively rapid response to control signals. This fuel metering device is, during a start mode and prior to the sensing of ignition, preferrably controlled in a pulse width modulation mode. This control mode will typically cause the fuel flow to vary, in accordance with a predetermined duty cycle, between low or no flow and a flow rate which may approach twice that determined by the engine manufacturer and incorporated in a starting schedule. Apparatus in accordance with the invention also includes means for terminating the modulation of the metering device control signal upon the achieving of ignition. In a preferred embodiment ignition is presumed to be commensurate with a rate of change of engine exhaust gas temperature which exceeds a preselected limit.

BRIEF DESCRIPTION OF DRAWINGS

The drawing is a functional block diagram of a starting circuit for a fuel control in accordance with the invention.

BEST MODE OF CARRYING OUT THE INVENTION

With reference to the drawing, a gas turbine engine has been indicated schematically at 10. Engine 10 will have a gas generator which includes a plurality of burners, with associated fuel nozzles, which receive a combustible liquid fuel from a pressurized source, not shown. The fuel source will typically comprise a pump driven by engine 10. Accordingly, at the initiation of a start cycle, the fuel pressure will be comparatively low. The amount of fuel, i.e., the fuel flow rate, delivered to engine 10 is controlled by means of a metering device 12. The metering or flow control device 12 may, for example, comprise the solenoid operated control shown in FIG. 4 of co-pending application Ser. No. 183,059, filed 9/20/80, now U.S. Pat. No. 4,393,651, and entitled FUEL CONTROL METHOD AND APPARATUS.

Alternatively, the metering device 12 could comprise a valve operated by a torque motor or stepping motor. The means for generating the control signals for metering device 12 may, by way of example only, include a gas turbine engine control similar to that described in U.S. Pat. No. 3,520,133. Thus, the fuel control will include means for providing fuel flow demand signals which are commensurate with a start schedule, an acceleration schedule, a normal speed control schedule and a temperature limit. The fuel flow demand signals are applied to an auctioneering circuit 14 which selects, as the control signal for metering device 12, that input signal which is calling for the lowest fuel flow rate.

During starting the rate of delivery of fuel to the engine will be in accordance with a starting schedule unique for the engine type, the starting schedule being provided by the engine manufacturer. Thus, the fuel control will comprise a function generator 16 which provides a fuel flow $W_F$ signal which corresponds to the proper fuel flow rate to cause ignition with better grade fuels and subsequently to bring the engine up to a speed within its normal operating range. Function generator 16 may comprise a microprocessor which is responsive to a signal commensurate with gas generator speed NG provided by conventional engine instrumentation. The $W_F$ signal provided by function generator 16 is, in accordance with the present invention, delivered as an input to a pulse width modulator 18. The $W_F$ signal is also delivered to a first terminal of a single pole double throw switch 20. While shown schematically as an electromechanical device, in actual practice switch 20 will customarily be an electronic switching device.

In accordance with one embodiment, the pulse width modulator 18 will provide an output pulse train having a fifty (50%) percent duty cycle with pulses which vary in magnitude between a minimum commensurate with the metering device 12 being essentially in the shut-off or no-flow condition and a maximum value which will be twice the magnitude of the input signal provided by function generator 16. This mode of flow control will result, when the output of modulator 18 is the control input to metering device 12, in the total volume of fuel delivered to the engine being equal to that determined by the ignition portion of the starting schedule as built or programmed into the function generator 16.

The output of modulator 18 is applied to a second terminal of switch 20. With switch 20 being in the position shown, and the engine being in the start mode as commanded by the pilot, the output of modulator 18 will be delivered via auctioneering circuit 14 as the control input to metering device 12. The burner fuel nozzles will thus, in the example being described, receive a modulated fuel flow which is essentially in the form of a series of slugs or pulses of fuel. Because of fluid inertia, with a 50% duty cycle the fuel delivery to the nozzles will never actually be cut-off and the maximum flow rate or slugs will not reach twice the scheduled rate. Nevertheless, the individual fuel pulses will be equivalent to a comparatively high flow rate and thus there will be a comparatively high pressure drop across the nozzles and, accordingly, a high degree of atomization even with a highly viscous fuel. However, as noted, the total volume of fuel supplied to the engine during the start mode will be approximately equal to that established by the preselected schedule and thus, when ignition occurs, the burners should not contain excess fuel and "hot" starts will be avoided.

The engine exhaust gas temperature T5 is sensed and fed back as the input signal to a differentiator 22. Differentiator 22 provides a T5DOT output signal which corresponds to the rate of change of the exhaust gas temperature. The T5DOT signal is applied as a first input to a comparator 24. The second input to comparator 24 will be a reference signal which corresponds to a "light-off" rate detection limit. If the actual rate of change of the exhaust gas temperature exceeds the reference, it may be presumed that ignition has been achieved. Accordingly, the output signal provided by comparator 24, when T5DOT exceeds the light-off rate detection limit, will constitute an indication of ignition. This comparator 24 output signal functions as the control for switch 20. Thus, upon the sensing of ignition, the state of switch 20 will be changed so as to disconnect modulator 18 from an input to auctioneering circuit 14 and to connect the output of the function generator 16 directly to the auctioneering circuit. Therefore, once ignition has been sensed the pulse width modulation of the metering device 12 is terminated and the remainder of the start cycle will be under the control of the preset starting fuel flow schedule.

While a preferred embodiment has been shown and described, various modifications and substitutions may be made thereto without departing from the spirit and scope of the invention. Accordingly, it is to be understood that the present invention has been described by way of illustration and not limitation.

We claim:

1. An improved method for causing the ignition of a gas turbine engine, the engine including burners having fuel nozzles and igniters associated therewith, said method including the steps of:
   initiating the delivery of pressurized fuel to the fuel nozzles;
   varying the average fuel flow rate in accordance with a pre-determined starting schedule, the starting schedule being commensurate with a fuel having a relatively low viscosity;
   simultaneously cyclically modulating the fuel flow rate to thereby cyclically vary the pressure drop across the fuel nozzles, the modulation varying the fuel flow rate between a level below that called for by the starting schedule and a level above that called for by the starting schedule, maximum fuel atomization occurring with the greatest pressure drop;
   monitoring a temperature commensurate with the engine exhaust;
   determining the rate of change of the monitored temperature;
   comparing the temperature rate of change with a reference; and
   terminating the cyclical modulation of the fuel flow rate when the rate of change of the monitored temperature exceeds the reference and thus indicates ignition of the fuel, the fuel flow rate varying in accordance with the starting schedule subsequent to termination of the cyclical modulation.

2. In a gas turbine engine control, the control including an electrically operable fuel metering device and means for generating fuel flow command signals for the metering device, the command signals varying in accordance with a starting schedule, an improved starting circuit comprising:
   means for pulse width modulating a fuel flow command signal commensurate with the starting schedule, said modulating means producing a pulse width modulated control signal for the metering device;
   means for delivering the pulse width modulated control signal to the metering device whereby the fuel flow will be varied as a function of the starting schedule and the pulse width modulation;
   means for sensing an engine temperature;
   differentiator means for computing the rate of change of the sensed temperature;
   means for comparing the rate of change of the sensed temperature with a reference, the reference being commensurate with a rate-of-change of temperature indicative of ignition, a switching control signal being produced when the actual rate-of-change of temperature exceeds the reference; and
   switch means responsive to said switching control signal for terminating delivery of said pulse width modulated control signal to the metering device and for coupling the command signals to said control signal delivering means whereby the control of the fuel metering device will be transferred to the fuel flow command signal generating means for the remainder of the starting schedule.

3. The method of claim 1 wherein the step of simultaneously modulating the fuel flow rate comprises pulse width modulating the control signal to an electrically operated fuel metering device.

4. The method of claim 1 wherein the step of simultaneously modulating the fuel flow rate comprises pulse width modulating the control signal to an electrically operated fuel metering device, the control signal being commensurate with the starting schedule.

* * * * *